United States Patent
Violand

(10) Patent No.: US 9,642,462 B2
(45) Date of Patent: May 9, 2017

(54) DRAWER PULL-OUT GUIDE

(71) Applicant: Julius Blum GmbH, Hoechst (AT)

(72) Inventor: Wilfried Violand, Gaissau (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 15/143,743

(22) Filed: May 2, 2016

(65) Prior Publication Data

US 2016/0242545 A1    Aug. 25, 2016

Related U.S. Application Data

(63) Continuation of application No. PCT/AT2014/000172, filed on Sep. 19, 2014.

(30) Foreign Application Priority Data

Nov. 4, 2013 (AT) .................................. A 842/2013

(51) Int. Cl.
*A47B 88/00* (2017.01)
*A47B 88/14* (2006.01)
(Continued)

(52) U.S. Cl.
CPC .............. *A47B 88/14* (2013.01); *A47B 88/40* (2017.01); *A47B 88/437* (2017.01);
(Continued)

(58) Field of Classification Search
CPC ..... A47B 88/14; A47B 88/0466; A47B 88/08; A47B 88/10; A47B 2088/0081; A47B 2210/0043; A47B 2210/0059
See application file for complete search history.

(56) References Cited

U.S. PATENT DOCUMENTS

| | | | | |
|---|---|---|---|---|
| 2008/0258592 | A1* | 10/2008 | Blum | A47B 88/0466 312/334.1 |
| 2013/0076221 | A1* | 3/2013 | Hammerle | A47B 88/0466 312/334.1 |
| 2013/0077900 | A1* | 3/2013 | Lowe | A47B 88/10 384/18 |

FOREIGN PATENT DOCUMENTS

| | | |
|---|---|---|
| AT | 501 777 | 11/2006 |
| AT | 008 732 | 12/2006 |

(Continued)

OTHER PUBLICATIONS

Austrian Search Report issued Aug. 26, 2014 in corresponding Austrian Application No. 842/2013 (with English translation).
(Continued)

*Primary Examiner* — Daniel Rohrhoff
(74) *Attorney, Agent, or Firm* — Wenderoth, Lind & Ponack, L.L.P.

(57) ABSTRACT

A drawer pull-out guide includes a basic-structure rail, which can be fastened on a basic furniture structure, and at least one pull-out rail, which is mounted such that it can be displaced relative to the basic-structure rail between an open position and a closed position. At least one lifting device is provided, by which the pull-out rail can be raised relative to the basic-structure rail towards the end of the closing movement. The lifting device has at least a two-part design, including a raising device, for raising the pull-out rail, and a bearing device, for supporting the pull-out rail in the closed position, and the raising device, in the closed position of the pull-out rail, is relieved of the loading of the pull-out rail.

16 Claims, 5 Drawing Sheets

(51) Int. Cl.
*F16C 29/00* (2006.01)
*A47B 88/40* (2017.01)
*A47B 88/437* (2017.01)
*A47B 88/487* (2017.01)

(52) U.S. Cl.
CPC .......... *A47B 88/487* (2017.01); *F16C 29/005* (2013.01); *A47B 2210/0043* (2013.01); *A47B 2210/0059* (2013.01)

(56) References Cited

FOREIGN PATENT DOCUMENTS

| DE | 197 51 164 | 6/1998 |
|---|---|---|
| DE | 10 2005 017 417 | 12/2005 |
| EP | 1 959 794 | 8/2008 |

OTHER PUBLICATIONS

International Search Report issued Jan. 8, 2015 in corresponding International Application No. PCT/AT2014/000172 (with English translation).

\* cited by examiner

DRAWER PULL-OUT GUIDE

BACKGROUND OF THE INVENTION

The present invention concerns a drawer extension guide, including a carcass rail which can be fastened to a furniture carcass, at least one extension rail which is supported displaceable relatively to the carcass rail between an open position and a closed position, and at least one lifting device, by way of which the extension rail can be raised relative to the carcass rail towards the end of the closing movement, wherein the lifting device is of at least two-part design, wherein the lifting device has a raising device for raising the extension rail and a bearing device for supporting the extension rail in the closed position.

Such drawer extension guides are already known and are mentioned for example in the EP 1 959 794 B1. In conventional drawer extension guides, rolling bodies located between extension rails can be deformed by forces permanently acting on them. For example, these forces result from the weight of a filled drawer. Especially in the closed state of the drawer extension guide, the force effect onto the rolling bodies is higher than during the extension process of the drawer. The deformation of the rolling bodies is expressed by a rattling noise and by an agitated sliding during opening and closing of the drawer. Drawer extension guides which have a bearing device arranged in an anterior end section of at least one extension rail relieve the rolling bodies arranged between the rails and protect them from deformation. Further, this bearing device causes the drawer to be slightly raised in the closed state, and so an adverse lowering of the drawer is prevented. Thus, the horizontally running joints between the front panels of cabinet drawers arranged one upon the other have a constant width so that the joint alignment visible from the outside is visually appealing. Because of the weight of the drawer acting on the bearing device, it is useful that the bearing device is made of a resistant material, for example metal. Even after a long period of use of the drawer, it is guaranteed by the bearing device, for example formed as metallic supporting rolling bodies, that these are fulfilling their purpose for a long runtime of the drawer extension guide. However, there exists a disadvantage. If the load device for example consists of a resistant hard material, for example metal, then the load device generates noises because of its material hardness when interacting with the at least one extension rail. For example: If a supporting rolling body made of metal is used as a load device, then superior rolling noises occur via the also metallic formed rolling bar when retracting the drawer than when using a softer plastic rolling body. These noises are not desired as well as the deformation of the rolling bodies and a non-uniform joint alignment.

SUMMARY OF THE INVENTION

Therefore, the invention should—while avoiding the previously described disadvantages—show a drawer extension guide which allows a noise-reduced raising of the extension rails by a raising device when retracting in the closed state of a drawer. In the closed state, the extension rails should be supported by a resistant bearing device and the rolling bodies should be relieved. At the same time, a uniform joint alignment of the front panels should be formed.

According to the invention, this object is solved in that the raising device is relieved of the extension rail in the closed position of the extension rail.

If a lifting device made of softer material—compared with the material hardness of the bearing device—is used, then the lifting device takes over the task of raising the rails noise-reduced. Thereby, the drawer is lifted by the softer lifting device in an area prior to its retracted end position, and the drawer is statically supported by the, for example metallic, supporting rolling body in the end position.

BRIEF DESCRIPTION OF THE DRAWINGS

Further details and advantages of the present invention are described more fully hereinafter by means of the specific description with reference to the embodiments illustrated in the drawings, in which.

DETAILED DESCRIPTION OF THE INVENTION

Figure 1:
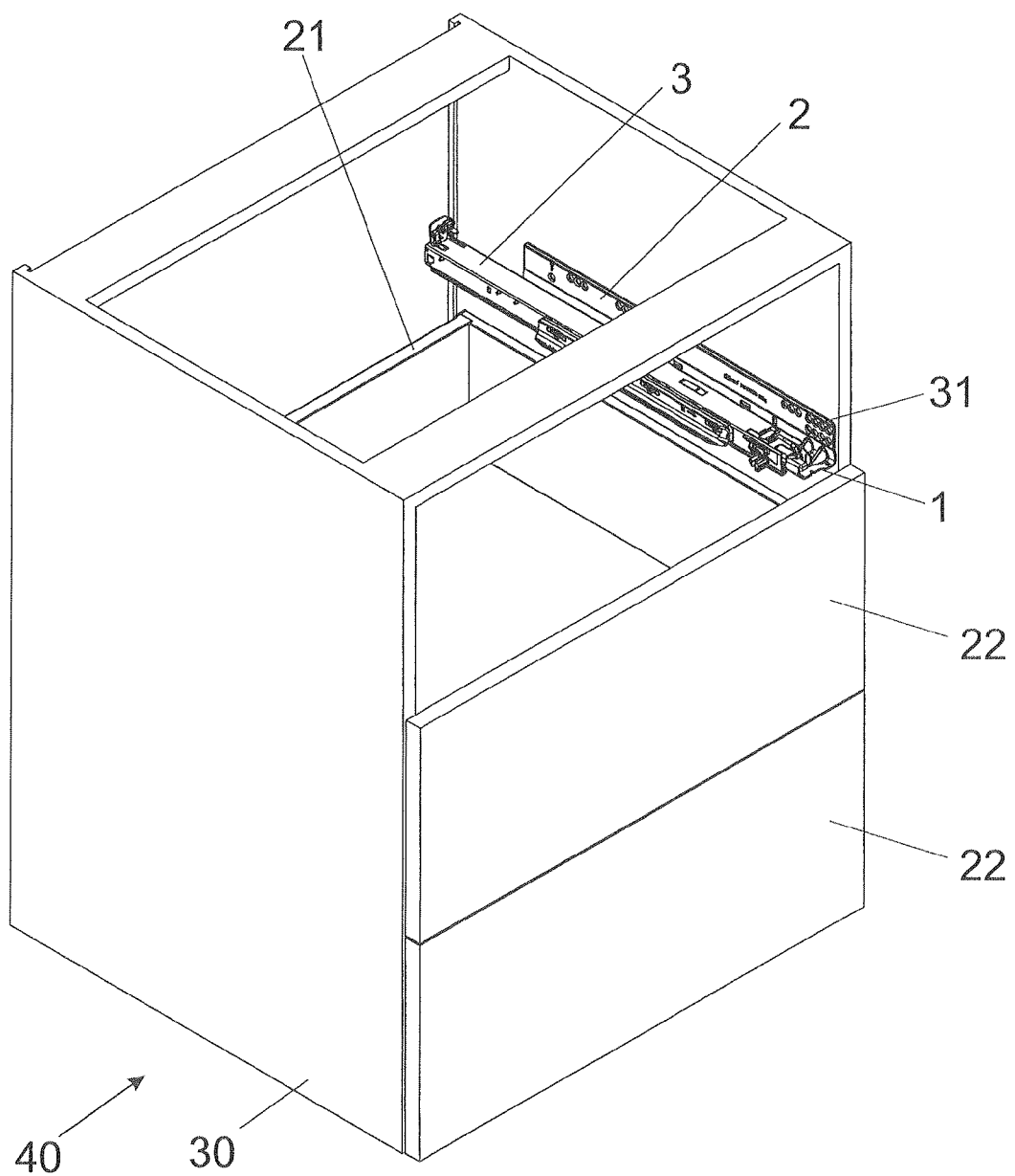
FIG. 1 shows a piece of furniture formed of a carcass with drawers on drawer extension guides.

FIG. 1 shows a piece of furniture 40 formed of a carcass 30. The carcass rail 2 is connected via its mounting area 31 with the carcass 30, the drawers 21 are laterally mounted at the extension rails 3a, 3b and are displaceable in the carcass 30. In the retracted state of the drawers 21, the front panel 22 is lining up with the carcass 30.

Figure 2:
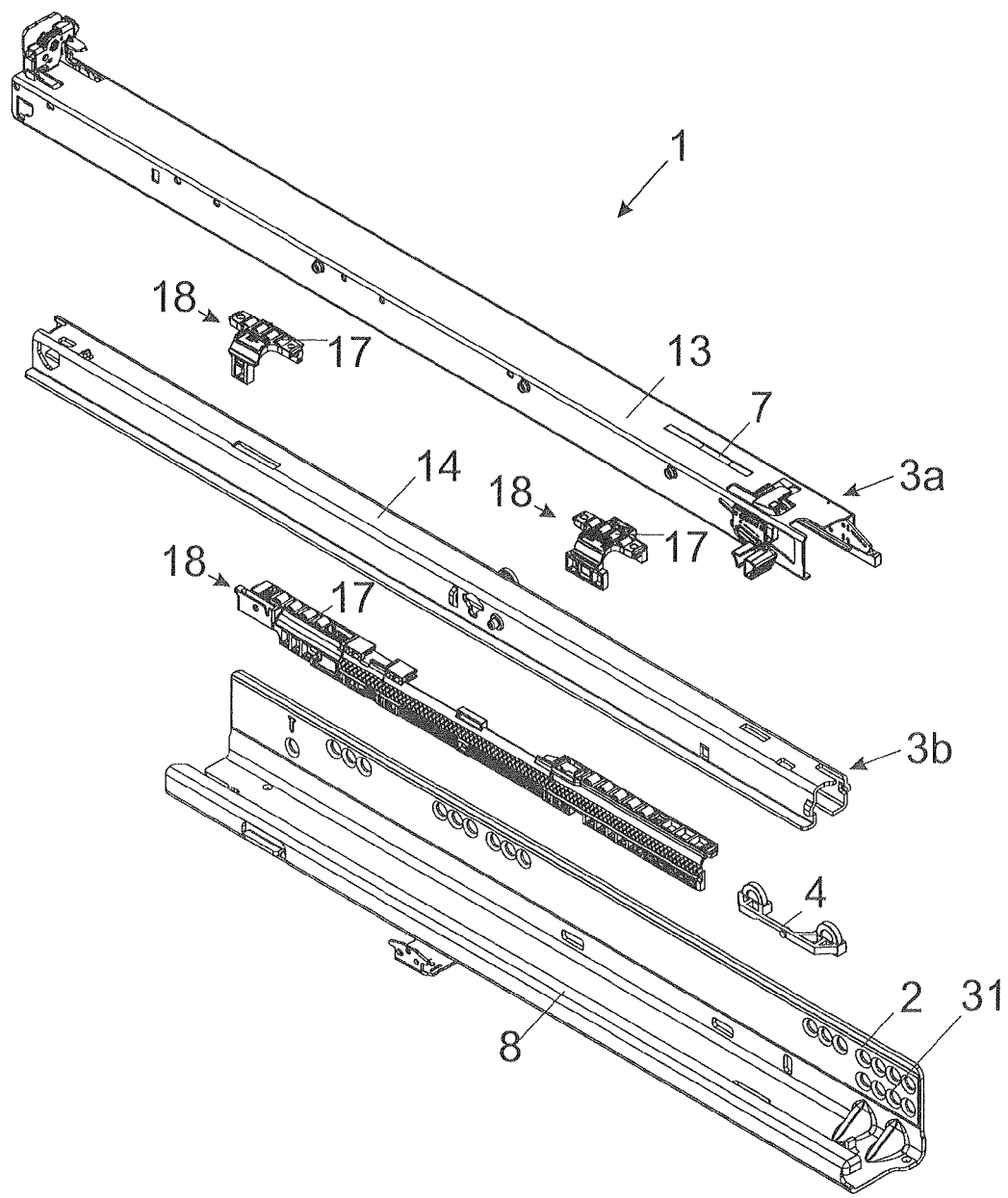
FIG. 2 shows an embodiment of a drawer extension guide in an exploded view.

FIG. 2 shows a drawer extension guide in an exploded view with its individual assembly groups. The extension rails 3a—formed of a drawer rail 13 which can be connected to the drawer—and the extension rails 3b—a center rail 14 located between drawer rail 13 and carcass rail 30—are supported lengthwise displaceably via the carriages 18 relative to the carcass rail 2 and relative to each other. A plurality of rolling bodies 17 is arranged in the carriages 18, and the rolling bodies 17 are rolling along the rolling track 8 of the carcass rail 2 and of the extension rail 3a, 3b. The lifting device 4 interacts with this rolling track 8 and with the elevation 7 as soon as the drawer extension guide 1 closes. In this embodiment, the elevation 7 is formed by an embossing of the extension rail 3a. In a further embodiment, the elevation 7 can also be located on the carcass rail 2 or can be built by the carcass rail 2.

Figure 3:
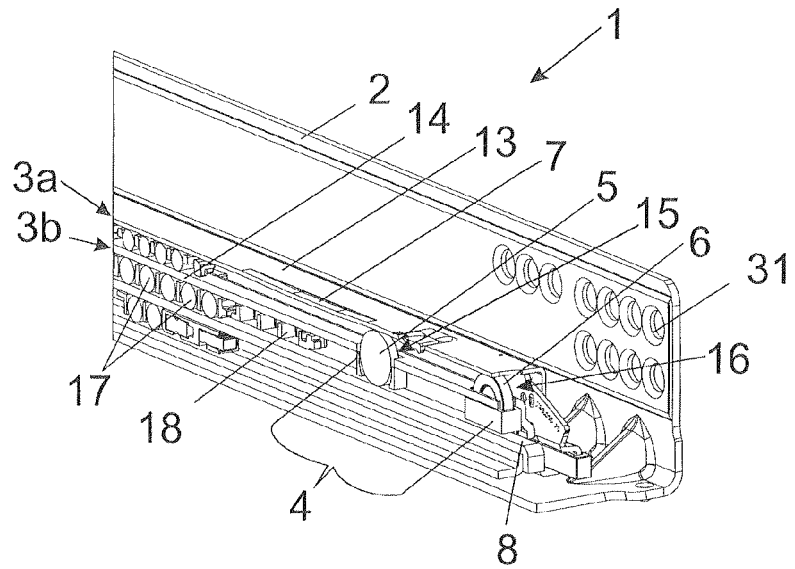
FIG. 3 shows an anterior end section of a drawer extension guide in a cross section.

FIG. 3 shows an anterior end section of a drawer extension guide 1 on which the extension rails 3a, 3b, for example comprising a center rail 14 and a drawer rail 13, are supported lengthwise displaceably. In addition to the rolling bodies 17, the lifting device 4 is also arranged between the rails 2, 3a, 3b of the drawer extension guide 1. The lifting device 4 comprises the raising device 5 with the lifting rolling body 15 and the bearing device 6 with the supporting rolling body 16. An elevation 7 similar to a ramp is located on the drawer rail 13, and the elevation 7 contacts the raising device 6 or the bearing device 6 towards the end of the retracting motion of the extension rails 3a, 3b in relation to each other and to the carcass rail 2.

Figure 4A:
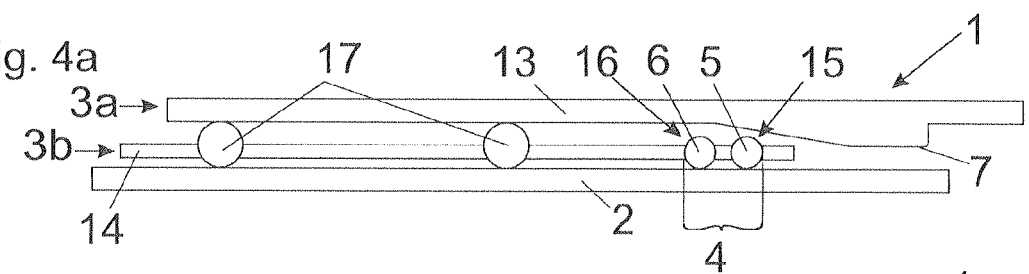
FIGS. 4a-4d show a schematic illustration of the drawer extension guide with different positions of the extension rail.

FIG. 4a shows a drawer extension guide 1 comprising a carcass rail 2 and the extension guides 3a, 3b, between which the rolling bodies 17 and the lifting device 4 are located. In this embodiment, the lifting device 4 comprises a raising device 5 and a bearing device 6 which are formed as lifting rolling body 15 and supporting rolling body 16. The center rail 14 and the drawer rail 13 are only supported on the rolling bodies 17 in the shown position of the drawer rail 12 relative to the carcass rail 2. The lifting device 4 has no contact to the extension guide 3. Thus, the whole load of the drawer 21 rests on the rolling bodies 17.

Figure 4B:
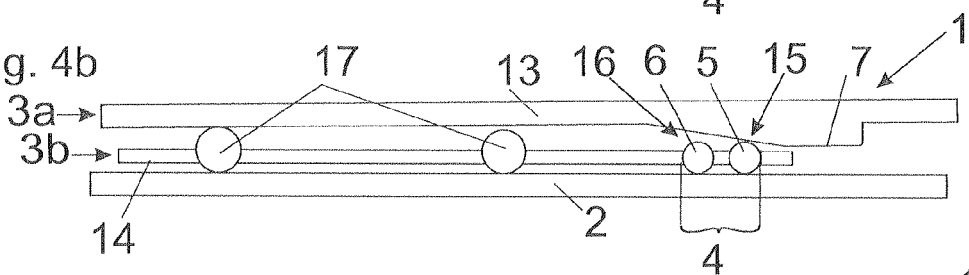

FIG. 4b schematically shows a drawer extension guide 1 in an area directed in the retracted state of the drawer 21, wherein now the raising device 5 interacts with the elevation 7. Because of the schematic illustration of the drawer extension guide 1, in each case only two rolling bodies 17 are indicated in FIG. 4a to FIG. 4b. As can be seen in FIG. 1, the drawer extension guide 1 not only comprises two rolling bodies 17 but a plurality of rolling bodies 17. The rolling bodies 17 are successively relieved from the weight of the drawer 21 by the lifting of the extension guides 3a, 3b when now further retracting the drawer 21. The lifting of the drawer rail 13 and the center rail 14 is effected by the interaction of the raising device 5 and the elevation 7.

Figure 4C:
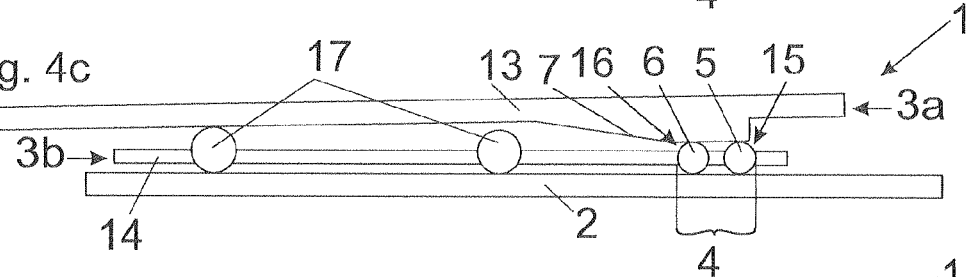

FIG. 4c shows in a schematic illustration the drawer extension guide 1, wherein the extension rail 3a, 3b is still further retracted in the direction of the end position than shown in FIG. 4b. In this position of the extension rails 3a, 3b relative to the carcass rail 2, the raising device 5 and the bearing device 6 in cooperation with the elevation 7 take on a large part of the weight of the drawer. The rolling bodies 17 are now substantially completely relieved from the weight of the drawer 21. Drawers 21 are often top-heavy because of their construction, filling and the front panels 22 and put a higher load to the anterior end section of the drawer extension guide 1 than to the posterior. Thus, the rolling bodies 17 arranged rearward are generally loaded less than those arranged forward.

Figure 4D:
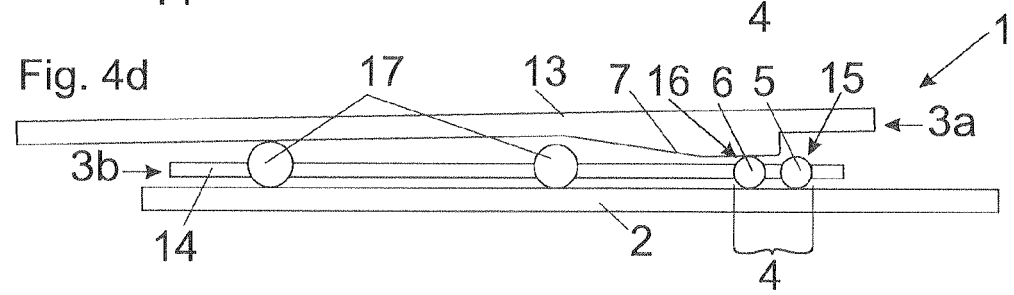

FIG. 4d shows schematically a drawer extension guide 1, wherein the drawer is in a retracted state. It can be recognized that the bearing device 6 consisting of the supporting rolling body 16 now carries the extension rail together with the elevation 7 and a part of the rolling body 17 which is slightly loaded with weight. The raising device 5 does not have contact to the elevation 7 anymore and is non-effective in the shown position. Thus, the whole load of the drawer is spread to the bearing device 6 (in other words the supporting rolling body 16), and to a small part of the rolling bodies 17. The large part of the rolling bodies 17 and also the raising device 5 are in the relieved state and, therefore, protected from deformation.

Figure 5A:
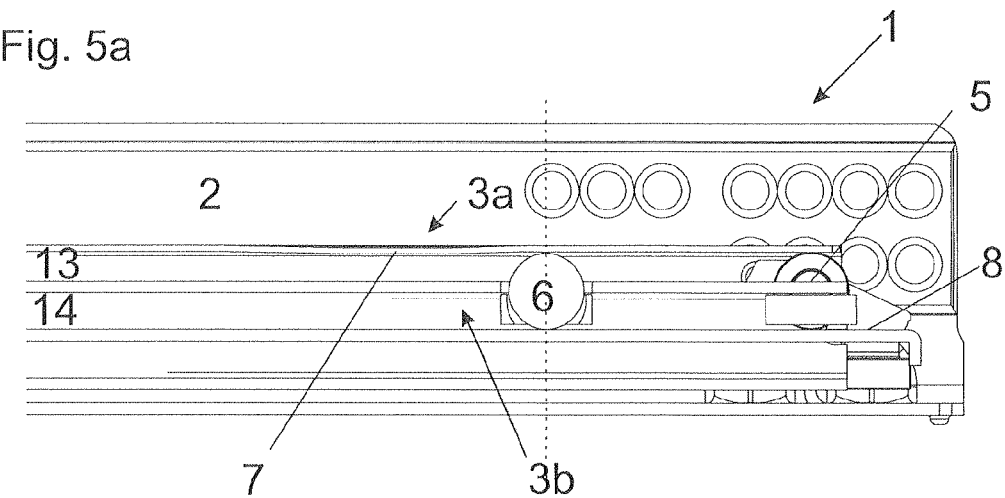
FIGS. 5a-5c show side views of the drawer extension guide with different positions of the extension rail.

FIG. 5a shows a part of a drawer extension guide 1 in a side view. There, the elevation 7 can be clearly recognized. In this drawing, it is recognizable that neither the raising device 5 nor the bearing device 6 are interacting with the elevation 7.

Figure 5B:
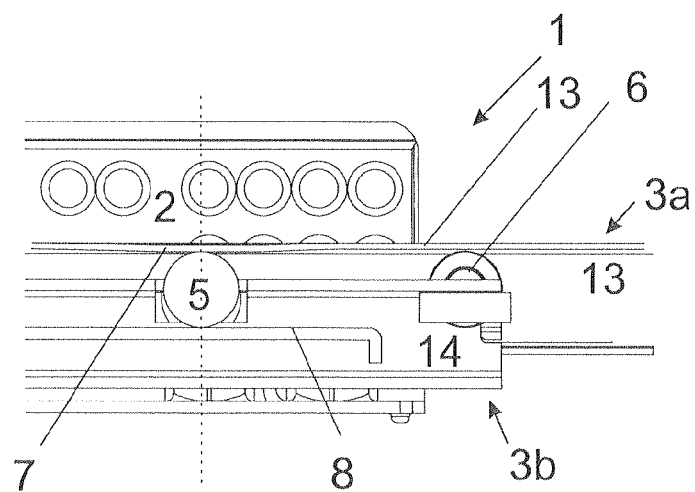

FIG. 5b shows an embodiment of a drawer extension guide 1 in the side view, wherein one of the extension rails 3a—the drawer rail 13—is located in an area prior to the end position of the drawer 21. The raising device 5, formed as a lifting rolling body 15, contacts the elevation 7 and raises the drawer rail 13 preparatory for the bearing by the bearing device 6. The bearing device 6, formed as a supporting rolling body 16, does not yet contact the elevation 7 in this position and is, therefore, relieved from the weight of the drawer 21.

Figure 5C:
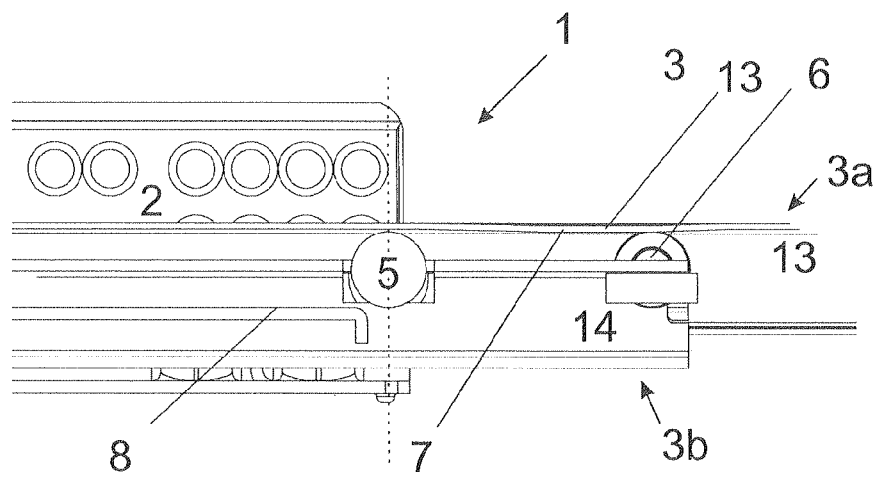

FIG. 5c shows how the bearing device 6, formed as a supporting rolling body 16, is located on the elevation 7 and shows how the raising device 5, formed as a lifting rolling body 15, is relieved.

Figure 6A:
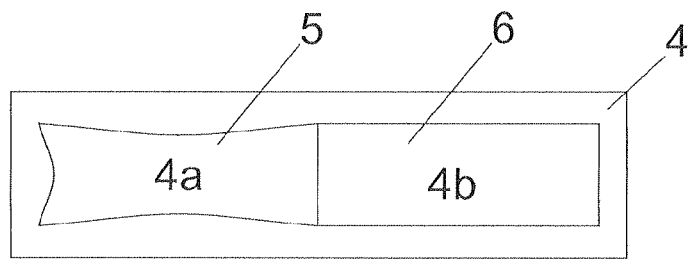
FIGS. 6a to 6b show a schematic illustration of an embodiment of a lifting device formed one-pieced.

FIG. 6a shows schematically the lifting device 4, comprising a first area 4a and a second area 4b. The first area 4a is the operating area of the raising device 5; the second area 4b is the operating area of the bearing device 6. As already shown in the previous drawing descriptions, the elevation 7—not shown in this figure—first interacts with the raising device 5 when retracting the drawer 21 and interacts with the bearing device 6 when further retracting the drawer. If now the area 4a is made of a softer material, for example a soft plastic, then noises of the drawer extension guide 1 can be reduced. From a static point of view, more resistant material, for example metal, is more suitable for supporting the drawer 21 than the soft plastic of the area 4a. The area 4b comprises the bearing device 6 which is—compared with the soft plastic—made of a harder and more resistant material. Here, for example, a metal is used which is characterized by a higher wear resistance and form stability than the plastic of the area 4a. Thus, the drawer is supported by the area 4b (in other words, the bearing device 6) in the retracted state of the drawer. The area 4a is relieved in this case. A soft and quiet driving and lifting of the drawer 21 is guaranteed by the area 4a and a long-term stable and resistant supporting of the drawer 21 is guaranteed by the area 4b.

Figure 6B:
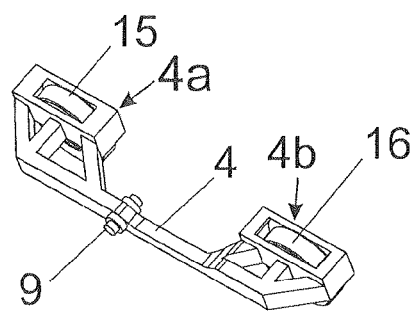

FIG. 6b shows a lifting device 4 with the two areas 4a and 4b. In this embodiment, the two areas are formed as a lifting rolling body 15 and a supporting rolling body 16. The lifting device 4 is seesawing connected to the at least one extension guide 3a, 3b by a bearing 9. The arrangement comprising the lifting device 4 with the lifting rolling body 15 and the supporting rolling body 16 can thus be adapted to the rolling track 8 and the elevation 7 by the seesawing bearing 9.

Figure 7:
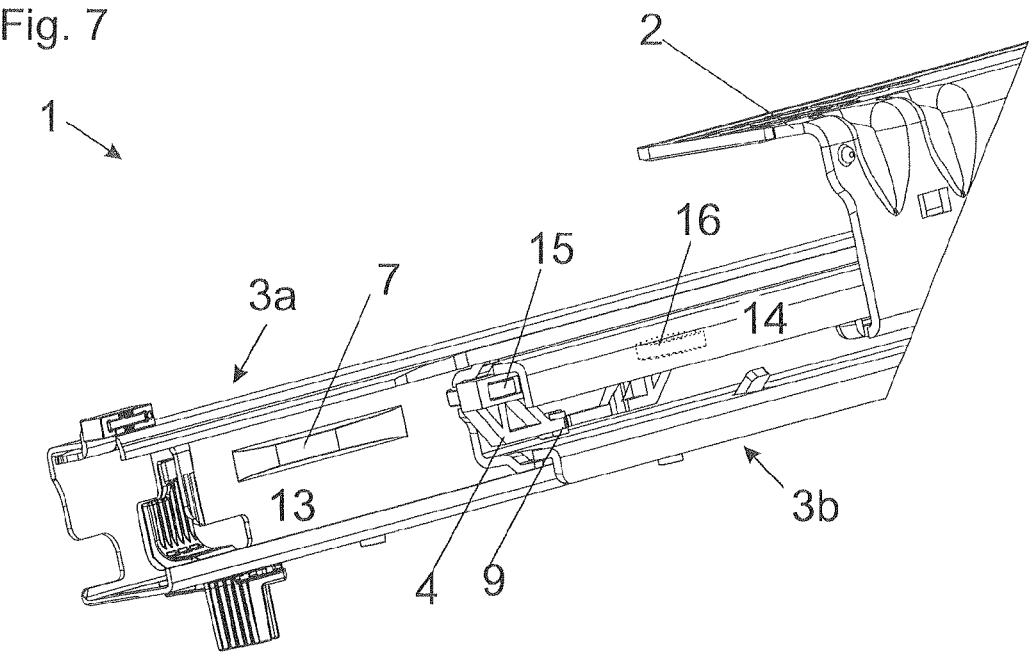
FIG. 7 shows an anterior area of a drawer extension guide in an extended state in a view from below.

FIG. 7 shows a partial area of a drawer extension guide 1, comprising a carcass rail 2 and the extension rails 3a, 3b, for example the center rail 14 and the drawer rail 13. When the lifting device 4 and the elevation 7 are cooperating in the retracted state of the drawer 21, the center rail 14 is supported by the bearing 9, while the drawer rail 13 is raised by the lifting rolling body 15 and the supporting rolling body 16. Therefore, the rolling bodies 17—which are not shown in FIG. 6—below and above the center rail 14 are relieved because the weight force is directly released from the drawer rail 13 via the dotted illustrated supporting rolling body 16 to the carcass rail 2.

The invention claimed is:
1. A drawer extension guide, comprising:
a carcass rail to be fastened to a furniture carcass,
an extension rail supported displaceable relatively to the carcass rail between an open position and a closed position,
a lifting device, by way of which the extension rail can be raised relative to the carcass rail towards the end of the closing movement,
wherein the lifting device has at least a two-part design, the lifting device having a raising device for raising the extension rail and a bearing device for supporting the extension rail in the closed position, wherein the raising device is relieved of the extension rail in the closed position of the extension rail.
2. The drawer extension guide according to claim 1, wherein the extension rail and the carcass rail have at least one of two configurations, the two configurations including

(i) the extension rail having an elevation directed to the carcass rail, and (ii) the carcass rail having an elevation directed to the extension rail.

3. The drawer extension guide according to claim 2, wherein the extension rail is configured to be raised by the interaction of the elevation and the raising device, and the elevation is supported by the bearing device in the closed position.

4. The drawer extension guide according to claim 2, wherein the elevation is formed by an embossing of at least one of the extension rail and the carcass rail.

5. The drawer extension guide according to claim 1, wherein the raising device is formed by a first area and the bearing device is formed by a second area, wherein the first area and the second area are connected to each other.

6. The drawer extension guide according to claim 5, wherein the first area is formed by the lifting device, the first area being at least one of (i) softer than the second area and (ii) formed of a different material than the second area.

7. The drawer extension guide according to claim 1, wherein the raising device comprises a lifting rolling body.

8. The drawer extension guide according to claim 7, wherein the bearing device comprises a supporting rolling body separate from the lifting rolling body.

9. The drawer extension guide according to claim 8, wherein the lifting rolling body consists of a different material than the supporting rolling body.

10. The drawer extension guide according to claim 8, wherein the lifting rolling body is softer than the supporting rolling body.

11. The drawer extension guide according to claim 8, wherein the lifting rolling body consists of plastic, and the supporting rolling body is made of metal.

12. The drawer extension guide according to claim 8, wherein the lifting rolling body and the supporting rolling body have the same diameter.

13. The drawer extension guide according to claim 1, wherein load transmitting rolling bodies are arranged between the carcass rail and extension rail, the load transmitting rolling bodies being separate from the lifting device.

14. The drawer extension guide according to claim 13, wherein the rolling bodies are arranged in a common, displaceably supported carriage.

15. The drawer extension guide according to claim 1, wherein the raising device and the bearing device are arranged one after the other on a rolling track.

16. An arrangement comprising a drawer and a drawer extension guide according to claim 1.

* * * * *